United States Patent [19]

Holt

[11] 4,149,626
[45] Apr. 17, 1979

[54] CONVEYING SYSTEMS

[75] Inventor: Barrie Holt, Poynton, England

[73] Assignee: Simon Container Machinery Limited, Stockport, England

[21] Appl. No.: 900,478

[22] Filed: Apr. 27, 1978

[30] Foreign Application Priority Data

Oct. 2, 1975 [GB] United Kingdom ............... 40236/75

[51] Int. Cl.$^2$ .............................................. B65G 1/06
[52] U.S. Cl. ................................... 198/718; 198/460; 198/809
[58] Field of Search ............... 198/721, 725, 751, 781, 198/718, 809

[56] References Cited

U.S. PATENT DOCUMENTS

| 2,932,380 | 4/1960 | Alvey, Jr. et al. | 198/809 |
| 3,116,823 | 1/1964 | Schneider | 198/809 |
| 3,136,406 | 6/1964 | DeGood et al. | 198/809 |
| 3,269,522 | 8/1966 | Fogg et al. | 198/809 |
| 3,322,259 | 5/1967 | Milazzo | 198/751 |
| 3,545,596 | 12/1970 | Turnbough et al. | 198/809 |
| 3,583,545 | 6/1971 | Hovekamp | 198/718 |
| 3,620,353 | 11/1971 | Foster et al. | 198/809 |
| 3,770,102 | 11/1973 | DeGood | 198/781 |
| 3,930,573 | 1/1976 | Wyman | 198/809 |
| 3,951,254 | 4/1976 | Juhrend | 198/819 |

FOREIGN PATENT DOCUMENTS 1380653  1/1975  United Kingdom ..................... 198/721

Primary Examiner—Robert B. Reeves
Assistant Examiner—Richard K. Thomson
Attorney, Agent, or Firm—Strauch, Nolan, Neale, Nies & Kurz

[57] ABSTRACT

An accumulating conveyor of the kind which is adapted to feed articles thereon towards the downstream end thereof to replace any removed therefrom comprising longitudinally extending laterally spaced conveying surfaces adapted to support articles which are to be fed towards the downstream end of the conveyor, and an endless conveying band is disposed between the conveying surfaces. A selected portion of the band is adapted to be moved from a lowered position to a raised position wherein it engages the underside of articles bridging the conveying surfaces to progress them towards the downstream end of the conveyor to replace any removed therefrom.

10 Claims, 7 Drawing Figures

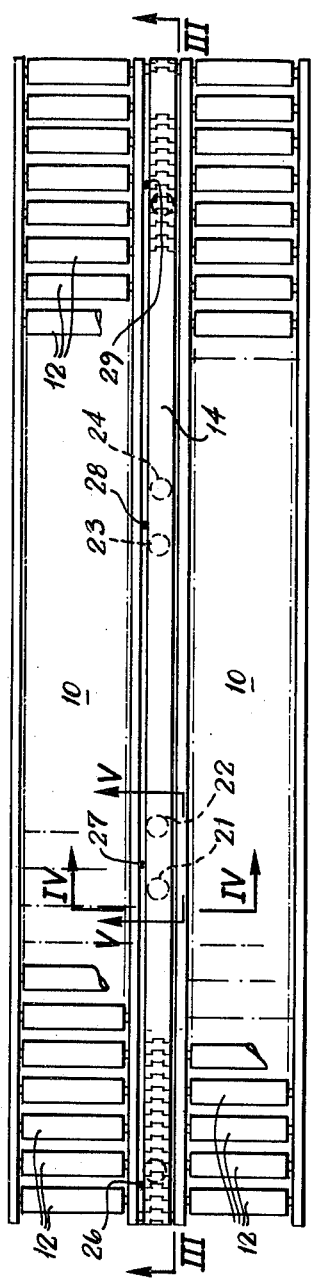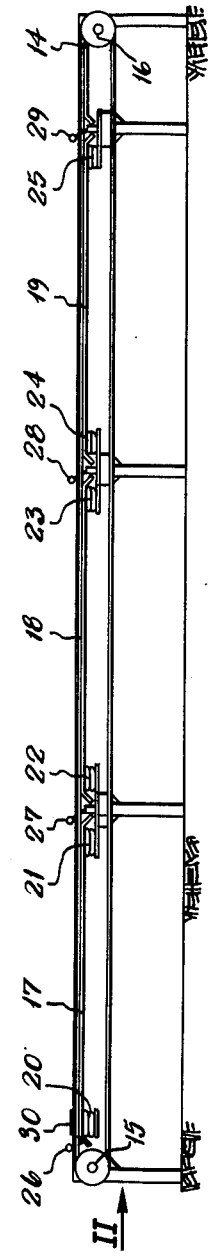
FIG.1
FIG.3

CONVEYING SYSTEMS

This invention concerns an accumulating conveyor of the kind adapted to feed articles thereon towards the downstream end thereof to replace any removed therefrom.

It is an object of the present invention to provide an accumulating conveyor of particularly simple construction and capable of use in a wide variety of applications.

According to the present invention there is provided an accumulating conveyor comprising longitudinally extending laterally spaced article support and conveying surfaces adapted to support articles which are to be fed towards the downstream end of the conveyor, an endless conveying band having upper and lower flights disposed between said conveying surfaces, and means for raising and lowering selected portions of the upper flight of said band whereby when raised the band portion engages the underside of articles bridging the conveying surfaces to progress them along said conveying surfaces towards the downstream end of the conveyor to replace any removed therefrom, said means comprising a plurality of lifting bars arranged longitudinally in end-to-end relation beneath the upper flight of said band, independently operable jack means at each end of each said lifting bar and control means operatively connected to said jack means whereby the respective ends of the lifting bars may be raised and lowered selectively and independently of one another.

The invention will be further apparent from the following description with reference to the several figures of the accompanying drawings which show, by way of example only, one form of accumulating conveyor embodying the invention and adapted to handle stacks of corrugated paper board blanks.

Or the drawings:

FIG. 1 shows a plan view of the accumulating conveyor;

FIG. 3 shows a sectioned side elevation of the accumulating conveyor on the line III—III of FIG. 1;

Figure 5:
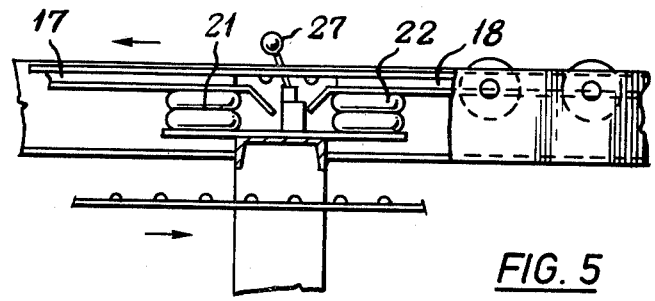
FIG. 5 shows a fragmentary cross-section through the accumulating conveyor on the line V—V of FIG. 1 with two adjacent lifting bars in their lowered positions.

Referring now to the drawings, it will be seen that the accumulating conveyor is essentially comprised by two longitudinally extending laterally spaced conveying surfaces 10, each of which is comprised by a bed formed from a plurality of transversely extending spaced parallel freely rotatable rollers 12. Between the two surfaces 10 is a longitudinally extending endless conveying band comprised by a loop of flat link chain 14 which passes around drive and tensioning rollers 15 and 16 at its two ends respectively. Located beneath the upper run of the flat link chain forming the endless conveyor are a number of lifting bars, in this example three, 17, 18 and 19 arranged in longitudinally extending end-to-end relationship. The bar 17 adjacent the downstream end of the conveyor is mounted on jack means comprising pneumatically inflatable air bags 20 and 21 arranged at its downstream and upstream ends respectively. The intermediate bar 18 is mounted on jack means comprising pneumtically inflatable air bags 22 and 23 located at its downstram and upstream ends respectively and the upstream bar 19 is mounted on jack means comprising pneumatically inflatable air bags 24 and 25 at its downstram and upstream ends respectively.

When any of the lifting bars is in a raised position on account of at least one of its supporting air bags being inflated, a portion of the flat link chain 14 is raised to engage the underside of any stacks bridging the conveying surfaces 10 in the vicinity of such raised portion. In this way such stacks will be driven along the conveyor towards its downstream end provided they are free to move in this direction. If they are not free then the flat link chain will run across the underside of the stacks without progressing them along the conveyor.

Figure 4:
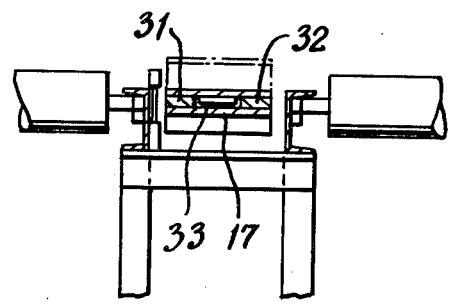
FIG. 4 shows a cross-section through the accumulating conveyor on the line IV—IV of FIG. 1.
Figure 6:
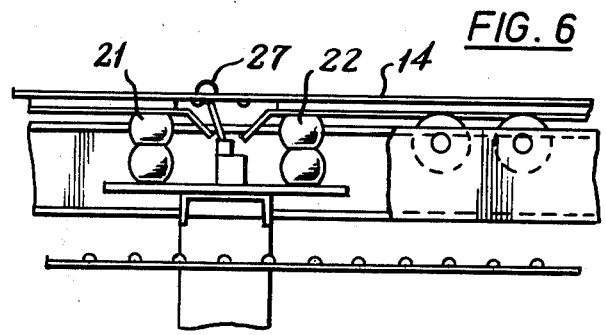
FIG. 6 shows a view similar to that of FIG. 5 but with the two adjacent bars in their raised positions.
Figure 2:
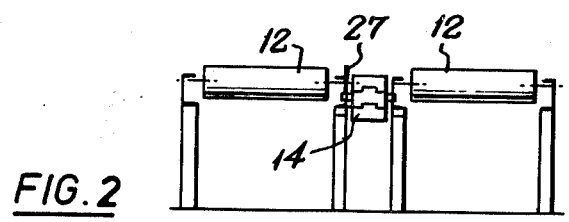
FIG. 2 shows an end view of the accumulating conveyor of FIG. 1.

As best seen from FIGS. 4 to 6 inclusive each of the bars 17, 18 and 19 has longitudinally extending laterally spaced runners 31 and 32 of nylon or other suitable material which define a groove 33 therebetween in which the hinge members between the adjacent links of the flat chain conveyor are located.

Micro-switchs 26, 27 and 28 are provided adjacent the downstream end of each of the bars 17, 18 and 19 respectively, and a further micro-switch 29 is provided at the upstream end of the bar 19. Each of the micro-switches 26, 27, 28 and 29 is provided with an actuator which protrudes upwardly to be situated at a level above the conveying surface of the rollers 12 of each of the surfaces 10.

The micro-switches 26 and 29 are associated with the air bags 20 and 25 respectively. The micro-switch 27 is associated with both of the air bags 21 and 22 and the micro-swtich 28 is associated with both of the air bags 23 and 24. The micro-switches are connected to a logic control system 50 (see FIG. 7) which controls inflation and deflation of the air bags.

Depression of the actuator associated with the micro-switch 26 causes the bag 20 to be deflated. Timing devices are provided in the system 50 such that prolonged depression of the actuators associated with any of the switches 27, 28 and 29 causes the air bags associated with those switches to be deflated. It will be understood that the deflation of any air bags causes a length of the flat link chain 14 to be lowered in the region of such air bags from engagement with stacks on the conveyor thereabove. In this way the mere passage of a stack over one of the micro-switches 27, 28 and 29 will not cause the associated air bags to be deflated. Deflation will only occur if a stack becomes arrested over one of these micro-switches.

A friction brake 30 is provided at the extreme downstream end of the conveyor such that the stack nearest to the downstream end rests on the brake 30 when the air bag 20 is deflated.

It will be understood that when the upper surface of the conveying band 14 engages with the underside of stacks to propel them along the conveyor, the weight of the stacks is essentially carried by the rollers 12. Stacks can move downwardly on the conveyor even if the conveying band 14 were lowered therebeneath by being pushed along the rollers 12 by following stacks.

Figure 7:
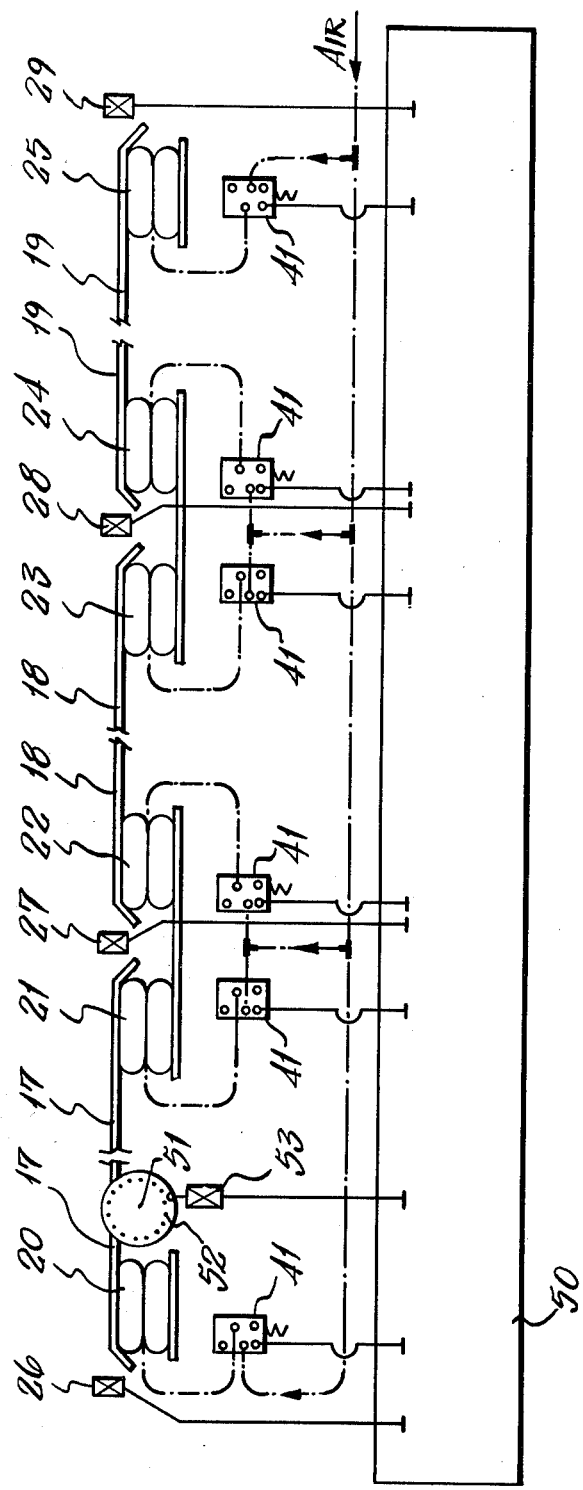
FIG. 7 is a combined pneumatic and electrical circuit diagram illustrating modes of operation of the conveyor.

The conveyor is adapted to perform two essential modes of operation as provided by the control circuit of FIG. 7. The two modes may be considered as an accumulation cycle and a call-off cycle.

Considering firstly the accumulation cycle and assuming that the conveyor is empty, all of the air bags 20 to 25 will be raised. As can be seen from FIG. 7, an air supply line 55 is connected to the air bags 20 to 25 under the control of solenoid operated valves 41 connected to the logic control system 50.

When a first stack is introduced on to the conveyor the micro-switch 29 is actuated which causes the chain 14 to be driven forwardly. The stacks are therefore conveyed down the conveyor towards the discharge end until the first stack actuates microswitch 26 whereupon the air bag 20 is deflated and the stack comes to rest on the friction brake 30. Subesequent stacks are conveyed forwardly until they accumulate behind the first stack to an extent whereby micro-switch 27 is actuated. Prolonged depression of micro-switch 27 causes air bags 21 and 22 to be deflated.

Accumulation continues in this manner until stacks occupy the whole of the conveyor and micro-switch 29 is actuated whereupon the drive to the chain 14 is discontinued.

It is conceivable that the stack resting on the friction brake 30, if relatively small, can be pushed forwardly owing to pressure applied by succeeding stacks to the extent that the first stack is moved. To prevent the first stack from being pushed off the downstream end of the conveyor there is provided a wheel 51 which is rotatable and in frictional contact with the base of the first stack. The wheel 51 is provided with a plurality of circumferentially spaced pegs 52 which, upon rotation of the wheel 51, are caused to actue a micro-switch 53. Thus, any movement of the stack above the wheel 51 causes the latter to rotate and actuate the switch 53, and the system 50 is adapted upon actuation of the switch 53 during the accumulation cycle, to cause deflection of the next successive pair of air bags which are to be deflated. This reduces the tractive effort of the chain, thus in turn reducing the pressure applied to the rear face of the first stack of the conveyor.

In the call-off cycle, and assuming the conveyor to be substantially filled with stacks, the operator can cause removal of stacks from the conveyor by introducing a call-off signal to the system 50. This may be by way of a overhead switch which can be actuated manually by the operator when required. While the signal is held by the operator the first beam 17 is raised horizontally by inflation of air bags 20 and 21 so that stacks on the beam 17 are conveyed forwardly. The micro-swtich 53 associated with wheel 51 is disconnected during maintenance of the call-off signal. When the operator has received the required number of stacks the call-off signal is discontinued and the beam 17 is lowered by delation of the air bags 20 and 21 so that once again the leading stack is located on the friction brake, and micro-switch 53 is brought back into operation.

Lowering the beam 17 in the call-off cycle causes the next beam 18 to be raised by inflation of the air bags 22 and 23. Thus, the stacks on the beam 18 are conveyed forwardly to fill the space created on beam 17. Beam 18 is raised for a predetermined period by means of a timer included in the logic system 50 and this period is set in accordance with the time taken to replace all of the stacks previously located on beam 17. Of course, if less than all of the stacks on beam 17 were removed then the space will be filled in less time than is provided by the timer and again the leading stack will be driven forwardly thus rotating wheel 51 and actuating switch 53 to cause the timer to be over-ridden and for air bags 22 and 23 to be deflated. Lowering of beam 18 causes beam 19 to be raised by consequent inflation of air bags 24 and 25. Where the conveyor comprises further sections these will rise in turn until the call-off cycle is completed.

During the call-off cycle stacks can be introduced on to the conveyor for accumulation until the conveyor is full whereupon the micro-switch 29 is actuated to discontinue the drive to chain 14.

It will be appreciated that the logic system 50 is comprised by solid state electronic components designed and arranged in according with the performance required by the conveyor, and whose details do not form part of the invention claimed herein.

It will be understood that during the accumulation cycle in many instances, one of the bars 17 to 19 inclusive will be disposed such that its downstream end is lowered whilst its upstream end is raised.

What is claimed is:

1. An accumulating conveyor comprising longitudinally extending laterally spaced article support and conveying surfaces adapted to support articles which are to be fed towards the downstream end of the conveyor, an endless conveying band having upper and lower flights disposed between said conveying surfaces, and means for raising and lowering selected portions of the upper flight of said band whereby when raised the band portion engages the underside of articles bridging the conveying surfaces to progress them along said conveying surfaces towards the downstream end of the conveyor to replace any removed therefrom, said means comprising a plurality of lifting bars arranged longitudinally in end-to-end relation beneath the upper flight of said band, independently operable jack means at each end of each said lifting bar and control means operatively connected to said jack means whereby the respective ends of the lifting bars may be raised and lowered selectively and independently of one another.

2. An accumulating conveyor according to claim 1, said control means including switch means at the downstream end of the lifting bar nearest the downstream end of the conveyor, further switch means at the upstream end of the lifting bar furthest from the downstream end of the conveyor, still further switch means at the junctions between each adjacent pair of lifting bars, and an actuator for each said switch means protruding upwardly to be situated at a level above the conveying surfaces whereby articles located on the accumulating conveyor may operate any switch means over which they are positioned.

3. An accumulating conveyor according to claim 2, wherein the switch means at the downstream end of the lifting bar nearest the downstream end of the conveyor is operable to cause the jack means nearest the downstream end of the conveyor to lower the said downstream end of the lifting bar nearest the downstream end of the conveyor when an article is located over such switch means.

4. An accumulating conveyor according to claim 3, wherein when the downstream end of the lifting bar nearest the downstream end of the conveyor is in its lowered position the article nearest the downstream end of the conveyor is located on stop means to prevent it being displaced from the conveyor by further articles pushing against it from the upstream end of the conveyor.

5. An accumulating conveyor according to claim 2, wherein each switch means at the junction between the ends of each adjacent pair of lifting bars and the switch means at the upstream end of the conveyor all are operable to cause the jacks or jack immediately adjacent thereto to raise the ends or end of the lifting bars or bar associated therewith when no articles are located over such switch means or when articles pass thereover while being fed down the conveyor, and to lower the ends or end of the lifting bars or bar associated therewith when any article is stationary over such switch means.

6. An accumulating conveyor according to claim 1 said control means being operable to cause all or selected ones of said jack means to raise the ends of the lifting bars associated therewith for the purposes of delivering articles from the accumulating conveyor and filling any spaces on the accumulating conveyor.

7. An accumulating conveyor according to claim 1, wherein each said jack means is comprised by a pneumatically inflatable and deflatable air bag.

8. An accumulating conveyor according to claim 1, wherein said laterally spaced article support and conveying surfaces are each comprised by a bed formed from a plurality of transversely extending spaced parallel freely rotatable rollers.

9. An accumulating conveyor according to claim 1, wherein said endless conveying band is comprised by a loop of flat link chain.

10. An accumulating conveyor according to claim 9, wherein each lifting bar includes a groove on its upper surface in which the hinge members between adjacent links of the flat link chain are located.

* * * * *